US007444188B2

(12) United States Patent
De Meyer et al.

(10) Patent No.: US 7,444,188 B2
(45) Date of Patent: Oct. 28, 2008

(54) METHOD AND HUMAN-MACHINE-INTERFACE (HMI) SYSTEM FOR CONTROLLING AND MONITORING A TECHNICAL INSTALLATION

(75) Inventors: Frederik De Meyer, Nuermberg (DE); Roland Heymann, Erlangen (DE)

(73) Assignee: Siemens AG, Munich (DE)

( * ) Notice: Subject to any disclaimer, the term of this patent is extended or adjusted under 35 U.S.C. 154(b) by 690 days.

(21) Appl. No.: 10/652,024

(22) Filed: Sep. 2, 2003

(65) Prior Publication Data

US 2005/0021158 A1 Jan. 27, 2005

(30) Foreign Application Priority Data

Jul. 22, 2003 (EP) .................................. 03016487

(51) Int. Cl.
*G05B 11/01* (2006.01)
*G05B 15/00* (2006.01)
*G05B 23/02* (2006.01)
*G06F 3/00* (2006.01)

(52) U.S. Cl. ............................ 700/17; 700/83; 340/3.1; 715/708; 715/866

(58) Field of Classification Search ................... 700/17, 700/83; 340/3.1; 715/708, 866
See application file for complete search history.

(56) References Cited

U.S. PATENT DOCUMENTS 6,020,881 A 2/2000 Naughton et al.
6,167,464 A * 12/2000 Kretschmann ............... 710/15

(Continued)

FOREIGN PATENT DOCUMENTS

WO WO 00/02344 A 1/2000

(Continued)

OTHER PUBLICATIONS

Sep. 12, 2006 European Search Report.

*Primary Examiner*—Ronald D Hartman, Jr.
(74) *Attorney, Agent, or Firm*—Sughrue Mion, PLLC

(57) ABSTRACT

A method and associated system for controlling and monitoring a technical installation (M1, M2), which is assigned at least one regional control area (OA1, OA2), uses a universal, mobile control and monitoring module (MU) and includes three steps. In a first step, the current position of the mobile control and monitoring module (MU) is determined by means of positioning signals. In a second step, the mobile control and monitoring module (MU) is assigned to a technical installation (M1, M2), if the current position of the mobile control and monitoring module lies within the regional control area (OA1, OA2) of that technical installation (M1, M2). In a third step, HMI data of the technical installation (M1, M2) is loaded into the assigned mobile control and monitoring module (MU). The assignment of the universal, mobile control and monitoring module (MU) to the technical installation (M1, M2) is not fixed or permanent, but only temporary. Thus, only HMI data that are required to carry out the respectively desired control and monitoring tasks on the assigned technical installation (M1, M2), or on a certain part thereof, needs to be selectively loaded into the control and monitoring module (MU). If an operator carries along the control and monitoring module (MU), he or she can leave the regional control area (OA1, OA2) of the technical installation (M1, M2) and enter the regional control area (OA1, OA2) of another technical installation (M1, M2) without restrictions. Then, a temporary assignment to that installation is possible.

39 Claims, 6 Drawing Sheets

U.S. PATENT DOCUMENTS

| | | | | |
|---|---|---|---|---|
| 6,254,105 | B1 | 7/2001 | Rinde et al. | |
| 6,717,382 | B2 * | 4/2004 | Graiger et al. | 318/587 |
| 7,017,116 | B2 * | 3/2006 | Elsbree et al. | 715/740 |
| 2002/0180604 | A1 * | 12/2002 | Yamaashi et al. | 340/573.1 |
| 2003/0061295 | A1 * | 3/2003 | Oberg et al. | 709/208 |

FOREIGN PATENT DOCUMENTS

| | | |
|---|---|---|
| WO | WO 00/17737 A | 3/2000 |

* cited by examiner

METHOD AND HUMAN-MACHINE-INTERFACE (HMI) SYSTEM FOR CONTROLLING AND MONITORING A TECHNICAL INSTALLATION

The following disclosure is based on European Patent Application No. 03016487.5, filed on Jul. 22, 2003, which is incorporated into this application by reference.

FIELD OF AND BACKGROUND OF THE INVENTION

The invention relates to a method and an HMI system for controlling and monitoring a technical installation.

Technical installations include all types of technical equipment and systems, both individually in stand-alone arrangements and interconnected in data networks, e.g., via a field bus. In industrial applications, such technical installations include individual apparatuses, such as drives and processing machines. However, a technical installation can also be a production plant, in which an entire technical process is operated by locally distributed control apparatuses. Such a production facility is, for example, a chemical facility or an assembly line. Technical installations are controlled and operated by special digital data processing systems, which are also referred to as automation systems. Such systems include devices for the direct control of the technical installation, i.e., programmable logic controllers or PLCs. To relieve these controllers, automation systems have other special devices that form an interface for operator personnel. These devices are called “control and monitoring” devices, (“C&M” for short), or HMI devices, i.e., human machine interfaces.

The term “HMI device” is a generic term and includes all the components belonging to this group of devices, such as, e.g., operator panels (OP for short). These operator panels can be stationary or mobile devices. In a networked automation system, operator personnel use HMI devices to display and control process data of the technical installation to be controlled. This function is referred to as “supervisory control and data acquisition” (SCADA). For this purpose, the HMI device usually has a special hardware structure, i.e., it is provided, for example, with a touch screen and is specially shielded against environmental influences. The HMI devices also use a special type of software, which provides functions to improve operational ease of use, quality and safety when the HMI devices are operated by an operator. For example, HMI devices can visualize, control, design and generate interactive process images or representations of the technical installation to be controlled. This makes it possible to selectively display responses of the technical installation, typically in the form of measured values and messages. In addition, specific operator actions and data inputs make it possible to bring the technical installation into desired states.

Conventionally, the devices of an automation system are fixedly assigned to the technical installation to be controlled. These devices include not only the control devices that are fixedly coupled to the technical installation, but, typically, also the HMI devices. The devices are usually uniquely assigned to the associated technical installation as a fixed component of the respective automation system, e.g., in the form of a terminal or an operator panel. All the machine and control specific data of the respectively associated technical installation, e.g., machine data, process images or representations, configuration files and much more, are loaded into the individual operator panels of an automation system. The runtime software of such an HMI device thus contains all the data and parameters necessary for the operator personnel to control and monitor precisely this technical installation or a part thereof.

However, such a fixed, data-related allocation or assignment of an HMI device to an automation system and the technical installation connected thereto has drawbacks. Since all the machine and control specific data of the installation is fixedly stored in the HMI device, the flexibility of such an HMI device is usually limited. Therefore, these HMI devices are often stationary and mounted in the immediate spatial environment of the associated technical installation. Thus, an operator has to go to the location of the respective HMI device and is therefore limited in his or her freedom to move. Furthermore, both the HMI device and the operator are continuously exposed to the environmental conditions present at the mounting site.

If such an HMI device must be replaced, all the machine and control specific data must be reloaded in order to completely restore the operability of the original HMI device. Even if the HMI devices are mobile, e.g., in the form of cable-bound or radio-linked handheld devices, they are typically allocated or assigned to a technical installation or to a control apparatus thereof in logically unique manner. Again, this typically means that all the design, display and machine data has to be loaded into the handheld device; i.e., the data must be kept available for all possible monitoring and control situations, irrespective of how frequently the data is actually used. As a consequence, the hardware and software for such HMI devices must be powerful enough and, thus, if such devices fail and have to be replaced, significant costs may be incurred.

OBJECTS OF THE INVENTION

It is one object of the invention to provide a method for controlling and monitoring a technical installation, and an associated HMI system for carrying out this method, which, compared to conventional HMI systems, offer significantly improved spatial and data-related flexibility.

SUMMARY OF THE INVENTION

According to one formulation of the invention, this and other objects of the invention are achieved by a method for controlling and monitoring a technical installation, to which at least one regional control area within a control area is assigned. The method uses a universal, mobile control and monitoring module and includes three steps. In a first step, the current position of the universal mobile control and monitoring module is determined by means of positioning signals. In a second step, the universal, mobile control and monitoring module is assigned to the technical installation, if the current position of the universal, mobile control and monitoring module lies within the regional control area of the technical installation. In a third step, HMI data of the technical installation is loaded into the assigned universal, mobile control and monitoring module.

The method according to the invention has many advantages. The invention is based on the principle that a universal, mobile control and monitoring module is not permanently assigned to a technical installation, but only temporarily. As a result, only the HMI data required to execute the respectively desired control and monitoring tasks on the assigned technical installation, or on a specific part thereof, needs to be selectively loaded into the control and monitoring module. If an operator carries the control and monitoring module along, he or she can leave the regional control area of one technical installation and enter the regional control area of another technical installation without restrictions. After passing through the three steps of the method according to the invention—i.e., first, determining the position of the control and monitoring module; secondly, assigning the control and monitoring module to the associated technical installation; and thirdly, downloading the HMI data of the technical installation into the control and monitoring module—the operator can also control and monitor this other technical installation without restrictions.

Thus, the control and monitoring modules can be used as universal devices, without requiring any pre-programming and pre-configuration whatsoever. These devices are also referred to as "client HMIs." It is thus readily possible that, e.g., in a control room of a large technical installation, such as a power station, a plurality of such universal mobile control and monitoring modules are available so as to be used by operator personnel on an only temporary basis, when the operator personnel makes inspection rounds as needed. Such client HMIs can be moved freely within the installation, without any mechanical connections and without having to take connection points into account. Furthermore, with the method according to the invention, mobile client HMIs can be temporarily used at locations within the installations where it would be difficult to use stationary C&M devices over a prolonged period of time, e.g., for lack of space or because of environmental conditions.

With the method according to the invention, a client HMI must be assigned to a technical installation within its regional control area before it can be used to influence that installation, i.e., in many cases, the client HMI must be located within the direct environment of the technical installation. Thereby, the safety requirement is met that machines can be operated only if the operator is located in their immediate vicinity.

Thus, intruders, who may have broken into a technical installation but are not directly on site, are prevented from manipulating the technical installation. Furthermore, the installation cannot be operated from positions that could cause a dangerous risk.

Advantageously, HMI initialization data is downloaded into the assigned universal, mobile control and monitoring module, together with the HMI data of the technical installation. This HMI initialization data advantageously parameterizes the display of HMI data of the technical installation on the assigned universal, mobile control and monitoring module.

This has the advantage that the way in which the HMI data is displayed differs from one installation to the next and can be optimally matched to the way the respective installation is operated. The way in which the data is displayed refers to, e.g., colors and font sizes, and to the contents of the displays, such as table forms and process images.

In a further exemplary embodiment of the invention, it is advantageous that, together with the HMI data of the technical installation, HMI display data is loaded into the assigned universal, mobile control and monitoring module. The HIM display data includes at least process values of the technical installation, in particular actual values and alarm messages of technical apparatuses of the technical installation.

This has the advantage that, for example, pre-settings and ongoing actual values, i.e., variable process quantities, can be downloaded directly into the universal mobile control and monitoring module, without requiring any action on the part of the operating personnel. This exemplary embodiment makes it readily possible, for example, that, after the three steps of the method according to the invention have been completed, only an especially critical process value of an installation is downloaded and displayed on the control and monitoring module, when an operator has entered the regional control area of this installation. On the other hand, recurrent, standardized dynamic process images can also be automatically displayed.

Advantageously, after being updated in a fourth step of the method according to the invention, the HMI data in the assigned universal mobile control and monitoring module can be uploaded into the technical installation, in particular in the form of HMI input data. The uploaded HMI data advantageously includes setpoint or specified values for the technical installation, in particular desired values and default values for technical apparatuses of the technical installation.

After an operator has been "monitoring" the current state of a technical installation, it may be necessary to change a parameterization, e.g., to slightly adjust the desired values for an ongoing technical process. An operator can enter these values into the mobile control and monitoring module, which can then be uploaded into the technical installation for updating purposes.

The method according to the invention thus eliminates the need for a client HMI to be "preloaded" with configuration information on all possible target environments. All the necessary information is made available to the client HMI at runtime when the client HMI is located within the regional control area of the respective technical installation or installation component. Thus, "empty" client HMIs can, for example, be taken out of a stockroom and put directly into operation, without any setup time being necessary. No configuration and reloading times and no potential errors attributable thereto occur. This makes it possible to reduce the data to be temporarily downloaded and buffered in a client HMI, which results in cost-effective hardware.

It is particularly advantageous if HMI data are downloaded or uploaded as a function of the location of the assigned universal mobile control and monitoring module in the regional control area of the assigned technical installation, in particular as a function of the distance from the technical installation.

This has the special advantage that only those HMI data need to be selectively transmitted that are required to perform control and monitoring tasks at a specific local site, in particular in a technical installation or a certain part thereof, and/or that an operator can safely process. If the transmission of the HMI data is controlled, e.g., as a function of the distance from the technical installation, certain operations can be blocked, e.g., for installation safety reasons, if an operator is too far away from the technical installation, i.e., out of visual range. On the other hand, certain operations may also be blocked for reasons of personal safety, if an operator is too close to the technical installation.

According to another formulation of the invention, an HMI system that is particularly suitable for carrying out the method according to the invention has at least one universal mobile control and monitoring module and at least one HMI data module assigned to the technical installation. The HMI data module has a managing device for, preferably cyclically, managing the HMI data of the technical installation. A managing-and-assigning device manages the regional control area of the technical installation and assigns the universal, mobile control and monitoring module to the technical installation, if the current position of the universal, mobile control and monitoring module lies within the regional control area of the technical installation. Finally, a loading device in the HMI data module causes the HMI data of the technical installation to be at least downloaded into the assigned universal, mobile control and monitoring module.

This exemplary embodiment has the particular advantage that a compact HMI data module is available to carry out the steps of the method according to the invention. Advantageously, the HMI module is integrated directly into the technical installation and can be coupled thereto via a data bus. Without too much complexity, this exemplary embodiment makes it possible to retrofit existing technical installations with an HMI data module. In addition, such a module can be replaced, e.g., when maintenance or service is due.

Preferably, the loading device is configured in such a way that the HMI data is transmitted in contactless manner to the assigned universal, mobile control and monitoring module. All the known standards for wireless data transmission may be used, e.g., IrDA infrared data transmission and radio transmission, e.g., with Bluetooth, WLAN, GMS or GPRS. Of course, the respectively used universal mobile control and monitoring modules must then be equipped with the corresponding communications interfaces. This makes it possible to use even mobile devices, which are primarily intended for other purposes, as mobile control and monitoring modules in a system according to the invention., e.g., mobile telephones or PDAs (Personal Digital Assistants) having a radio interface.

Advantageously, the HMI data module has a fourth unit, such as a receiver, for receiving at least transmission messages from the assigned universal, mobile control and monitoring module, wherein the transmission messages include at least HMI input data for updating the HMI data of the technical installation. Thus, an HMI data module of this kind handles the entire spectrum of tasks, except for the direct display and the specification of HMI data. These tasks include the preferably cyclical acquisition of the HMI data within the technical installation and the updating of the HMI data by receiving and adding HMI input data uploaded from a client HMI. The HMI data module also handles all data communications from and to client HMIs.

According to a further exemplary embodiment of the invention, the universal, mobile control and monitoring module of the HMI system according to the invention has a position determination device that analyzes positioning signals, which are provided by a satellite system, in particular a GPS satellite system, and that transmits the current position to the managing-and-assigning device of the HMI data module. In another exemplary embodiment, the position determination device analyzes the field strengths of local emission signals, which are received in the regional control area as positioning signals. In either case, it is advantageous, if existing navigation and emission systems are used for determining the position of the universal, mobile control and monitoring module.

Another HMI system that is suitable for carrying out the method according to the invention has at least one universal, mobile control and monitoring module, a central server, and an HMI communications module. The central server has a managing device for, preferably cyclically, managing HMI data of the technical installation. Further, the central server has a managing-and-assigning device for managing the regional control area of the technical installation and for assigning the universal, mobile control and monitoring module to the technical installation, if the current position of the universal, mobile control and monitoring module lies within the regional control area of the technical installation. In addition, HMI communications modules are assigned to technical installations. These modules have network terminals for connecting the modules to the central server. Further, the modules have a respective loading device to at least download HMI data of the technical installation into the assigned universal, mobile control and monitoring module.

In this second embodiment, the tasks of the HMI data module in the above-described first embodiment are divided between the central server and the HMI communications module. Therein, the managing device and the managing-and-assigning device of the server perform the same tasks as the corresponding devices of the above HMI data module. In contrast, the task of the loading device is assumed by separate HMI communications modules.

In the above-described first embodiment, the HMI data is decentrally managed in the individual HMI data modules. Thus, the HMI data is spatially assigned to the respective technical installations. In contrast, in the second embodiment, the HMI data is managed centrally in a server. Only the HMI communications modules, which have the functions of data interfaces, are locally distributed and assigned to the respective technical installations. Central HMI data management has the advantage that the HMI data of different technical installations or installation parts can be managed jointly. This also allows for comparative analyses and, e.g., long-term archiving of HMI data records. The server can also assume other functions centrally, e.g., user administration with regard to access rights for all the control and monitoring modules that can be used in the system.

In contrast, the technical requirements for the distributed HMI communications modules are comparatively low. This has cost-related advantages if modules fail. Advantageously, an HMI communications module has a receiver for receiving at least transmission messages from the assigned universal mobile control and monitoring module and for forwarding these transmission messages to the managing device of the central server. Therein, the transmission messages include HMI input data for the technical installation.

This second embodiment, which is based on centrally managing the HMI data of a plurality of technical installations by a server, has basically two options for determining the position of a control and monitoring module.

In a first option, the universal mobile control and monitoring module itself has a position determination device. The position determination device analyzes positioning signals, which are provided, e.g., by a satellite system, in particular a GPS satellite system, and transmits the current position to a receiver of a preferably neighboring HMI communications module. The receiver then forwards the current position to the managing-and-assigning device of the central server. Proximity or short-range fields of the universal, mobile control and monitoring module may also be used for determining the position of the module. Therein, the short-range fields can be based on a communications standard, such as Bluetooth or Fast Infrared.

In a second option, the HMI communications module has a receiver that receives emissions of the universal mobile control and monitoring module as positioning signals so as to determine the position of the module. The positioning signals are analyzed by the HMI communications module itself or transmitted to the central server to determine the position of the mobile control and monitoring module.

In another embodiment, the emissions received from a plurality of HMI communications modules and transmitted to the server are used in the server to determine the current position value of the emitting mobile control and monitoring modules. Therein, the receivers for the emissions of the universal, mobile control and monitoring module can be GSM transmitting and receiving devices, GRPS transmitting and receiving devices, or WLAN transmitting and receiving devices, which may be integrated into the HMI communications modules.

BRIEF DESCRIPTION OF THE DRAWINGS

The invention will now be described in greater detail, by way of example, with reference to the embodiments depicted in the figures, in which.

DETAILED DESCRIPTION OF THE PREFERRED EMBODIMENTS

Figure 1:
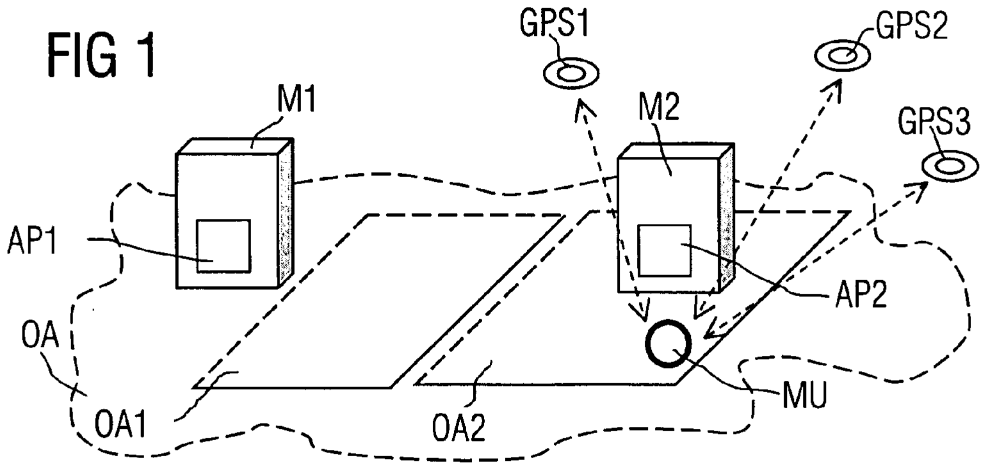
FIG. 1 shows a first embodiment of an HMI system according to the invention, wherein, by way of example, an HMI data module is integrated into a respective technical installation, and wherein, in a first step, positioning signals are received from a mobile control and monitoring module so as to determine the position of the mobile module.
Figure 2:
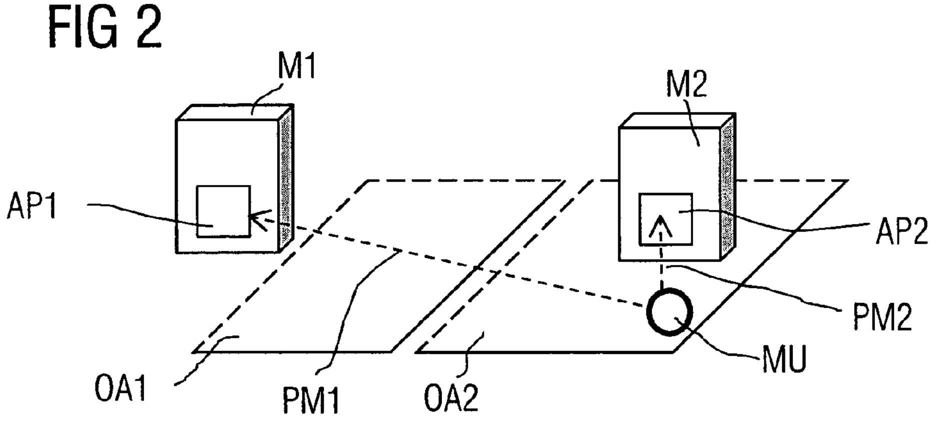
FIG. 2 shows the embodiment of FIG. 1, wherein the mobile control and monitoring module sends transmission messages, which include, in particular, position data, to HMI data modules located within the control area of a technical installation, whereby, in a second step, a data connection with an HMI data module that is assigned to the respective regional control area is established, and wherein thereby an assignment of the mobile module to the technical installation is accomplished.
Figure 3:
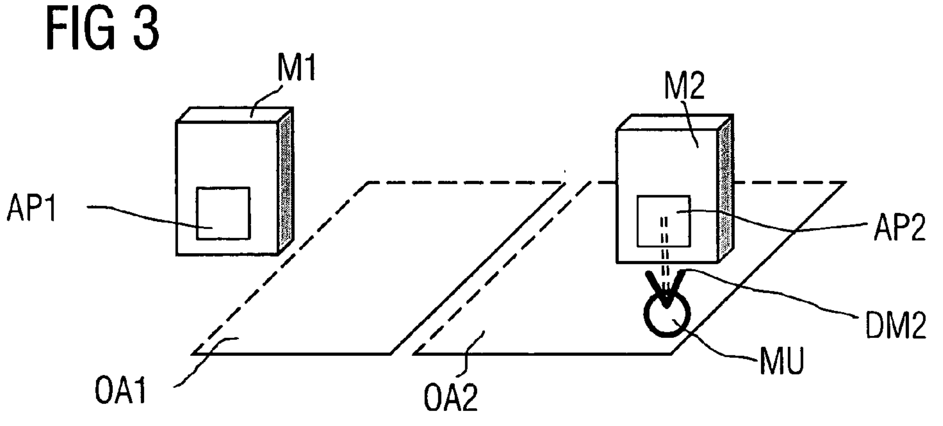
FIG. 3 shows the embodiment of FIG. 1, wherein, in a third step, the HMI data module, in whose regional control area the mobile control and monitoring module is located, sends HMI data to the mobile control and monitoring module, and wherein the HMI data include, in particular, HMI initialization data and HMI display data.

A first embodiment of an HMI system according to the invention will now be described with reference to FIG. 1 to 3. The figures show, by way of example, a control area OA, in which a first and a second technical installation M1, M2 are arranged. The two technical installations M1, M2 can be, for example, processing machines or machine tools and can represent a part of an entire plant area, e.g., a large technical installation. According to the invention, an HMI data module AP1, AP2, respectively, is assigned to the technical installations M1, M2. In FIG. 1 to 3, these HMI data modules are integrated into the respective technical installations, but they can also be placed in the immediate spatial surroundings thereof.

The control area OA includes, for example, a first regional control area OA1 and a second regional control area OA2. The first regional control area OA1 is assigned, for example, to the technical installation M1 located adjacent thereto and is managed by the first HMI data module AP1, which is connected to the technical installation M1. The second regional control area OA2 is assigned, for example, to the technical installation M2 located therein and is managed by the second HMI data module AP2, which is connected to the technical installation M2. According to the invention, the regional control areas OA1, OA2 ensure that the first or second technical installation M1 or M2 can be controlled only if an operator is located within the respectively assigned regional control area OA1 or OA2. By way of example, the first regional control area OA1 is located next to the first technical installation M1, because, for safety reasons, the operator is not permitted to approach the first technical installation M1. In contrast, the second technical installation M2 may be more or less completely surrounded by the regional control area OA2, because it is necessary or at least advantageous for a person to monitor the second technical installation M2 from all spatial directions when this installation is being operated.

According to the invention, universal, mobile control and monitoring modules MU are provided to operate the technical installations. These modules are preferably mobile, industrial handheld terminals, which typically have large displays, e.g., LCD displays, and a plurality of input keys and keypads. Also, mobile control and monitoring modules are often equipped with touch-sensitive displays, such as, in particular, touch screens. However, it is also possible to use non-industrial, wireless devices, e.g., mobile telephones or personal digital assistants (PDAs), as the mobile control and monitoring modules. In FIG. 1 to 3, a control and monitoring module MU is represented by a circle, which is located, for example, within the second regional control area OA2. For reasons of clarity, an operator is not depicted in FIG. 1 to 3.

FIG. 1 illustrates how, in a first step, the mobile control and monitoring module MU determines its current position by means of positioning signals. In the exemplary embodiment shown, positioning signals transmitted from a satellite system, in particular a GPS satellite system, are analyzed or evaluated. FIG. 1, for example, shows three transmitting and receiving stations GPS1, GPS2, GPS3 of the satellite system. The positioning signals transmitted therefrom are received by the control and monitoring module MU and evaluated so as to determine the position of the module MU.

Once the mobile control and monitoring module MU has determined its current position, the mobile module MU sends out transmission messages that contain at least the currently determined position data. FIG. 2 symbolically shows two transmission messages PM1, PM2. These messages are received by the HMI data modules AP1 and AP2, which are located within the control area OA. According to the invention, the data modules AP1 and AP2 have units for managing the regional control area of the associated technical installation. Each HMI data module can thus detect whether or not the mobile control and monitoring module MU is located within the associated regional control area. In the example of FIG. 1 to 3, the control and monitoring module MU is placed within the regional control area OA2 of the second technical installation M2. Thus, in a second step of the method according to the invention, the HMI data module AP2 assigns the mobile control and monitoring module MU to the second technical installation M2 and establishes a data connection to the control and monitoring module MU. In contrast, the HMI data module AP1 does not react, since, based on the analysis or evaluation of the transmitted position data, this HMI data module AP1 has detected that the control and monitoring module MU is located, at least for the moment, outside the regional control area OA1 managed by the HMI data module AP1.

FIG. 3 shows how, in a third step of the method according to the invention, the assigned HMI data module AP2, in whose regional control area the mobile control and monitoring module MU is currently located, loads HMI data into the mobile control and monitoring module MU. An operator can now temporarily use the control and monitoring module to perform control and/or monitoring actions related to the second technical installation M2.

The goal of these control and/or monitoring actions is to display HMI data of the second technical installation M2 on the mobile control and monitoring module MU for the benefit of installation personnel. In an additional, fourth step, installation personnel can transmit back to the HMI data module AP2 setpoint values or specified values, which are, e.g., manually entered into the control and monitoring module as HMI input values, so as to update the HMI data and thereby change the operating state of the technical installation M2. Therein, as shown in FIG. 3, at least data messages DM2 are downloaded from the HMI data module AP2 to the control and monitoring module MU. Advantageously, the data messages DM2 enable a bi-directional connection, i.e., HMI input data can also be uploaded from the control and monitoring module MU to the HMI data module AP2.

In the present invention, HMI data should be understood as all data that is necessary for integrated production management and the display and manipulation of which significantly influences the production result of the technical installation in terms of quantity and quality. This includes raw data that comes directly from the technical process taking place in the technical installation, e.g., the actual values of temperatures, numbers of units, etc., and the associated desired values. However, HMI data according to the present invention also includes data that has been further processed. The HMI data module can derive this further-processed data from the raw data. The derived data includes, for example, statistical trend analyses, OEE (Overall Equipment Efficiency) data, KPI (Key Performance Indicator) data, but also inventory management and work piece tracking information, planned maintenance orders and much more. This derived data is often referred to as MES data, i.e., Management Execution System data. In the present invention, the derived data is also considered part of the HMI data.

Depending on the data content, the HMI data can be output directly on the control and monitoring module MU as HMI display data. Preferably, this HMI display data includes process values of the technical installation M2, e.g., actual values and alarm messages of technical apparatuses, warning notices, etc. In addition, in the field of process automation, it is often desired to display, e.g., raw data in an easy-to-read form, e.g., in a dynamic process diagram. Furthermore, for safety reasons, operation forms or masks are often desired so as to specify HMI input data. To make this possible, HMI initialization data can be loaded, together with the HMI data, into the assigned universal, mobile control and monitoring module MU. This initialization data at least parameterizes the display of HMI data of the technical installation on the assigned, universal mobile control and monitoring module.

Advantageously, HMI data are transmitted as a function of the location of the assigned universal mobile control and monitoring module MU within the regional control area OA2 of the assigned technical installation M2, in particular as a function of the distance from the technical installation M2. This enables a fine grading of the HMI data transmitted on the download link or on the upload link. If an operator having a mobile control and monitoring module MU is located, e.g., at the edge of the regional control area OA2, it is feasible to release only those HMI data for transmission which do not require direct visual contact with the technical installation. On the other hand, the contents of HMI data can also be controlled as a function of the spatial direction. For example, for an operator standing, e.g., directly in front of the technical installation, it may be advantageous or necessary to supply that operator with HMI data contents, or to release HMI input data for manipulation purposes, that are different from those HMI data contents or HMI input data in a situation where the operator stands behind or next to the technical installation.

Figure 4:
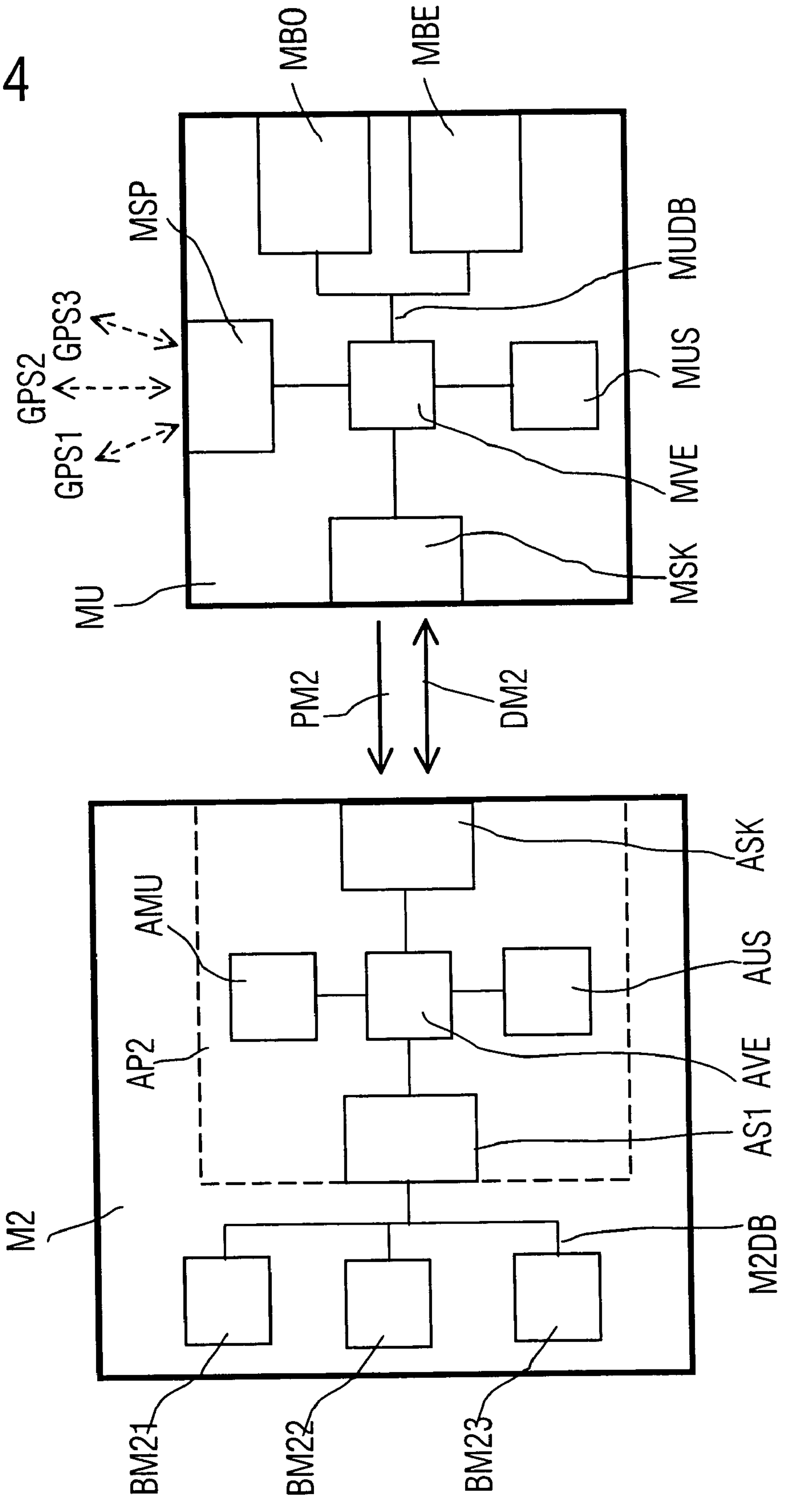
FIG. 4 shows a block diagram of an exemplary internal structure of a technical installation, into which an HMI data module according to the invention is integrated, and an exemplary internal structure of a mobile control and monitoring module that exchanges transmission and data messages with the HMI data module.

FIG. 4 is a block diagram of an exemplary internal structure of the second technical installation M2, which has an HMI data module AP2 according to the invention that is advantageously directly integrated into the second technical installation M2. Also depicted is an exemplary internal structure of a mobile control and monitoring module MU, which is temporarily assigned to the second technical installation M2 in accordance with the above-described exemplary embodiment of FIG. 1 to 3. Thus, the mobile control and monitoring module MU can exchange transmission and data messages DM2 with its HMI data module AP2.

According to FIG. 4, the second technical installation M2 has, for example, three internal technical operation apparatuses BM21, BM22, BM23. These apparatuses are associated with HMI data, i.e., they generate, for example, HMI display data or require, for example, HMI input data. The HMI data can be displayed and, if necessary, controlled by the mobile control and monitoring module MU according to the invention. The HMI data is managed, in particular selected, detected, updated, stored, and prepared, e.g., for displaying or archiving purposes, in the second HMI data module AP2 with respect to the apparatuses BM21, BM22, BM23 and with respect to the mobile control and monitoring module MU. The second HMI data module AP2 is linked to the apparatuses BM21, BM22, BM23 via an internal data bus M2DB and a first data interface AS1. In addition, the second HMI data module AP2 is linked to the mobile control and monitoring module MU via a second data interface ASK. The HMI data module AP2 uses these interfaces to update the HMI data, preferably cyclically, quasi in both directions, i.e., by downloading and uploading the HMI data.

This arrangement has the advantage that all the HMI data and the associated actions are prompted and processed by the HMI data module. This significantly relieves both the technical installation and the universal, mobile control and monitoring modules. In other words, no special hardware or software measures are required to manage the HMI data.

By means of a processing unit AVE in the HMI data module AP2, the HMI data of the internal apparatuses BM21, BM22, BM23 are supplied to a first unit AUS for preferably cyclical management, i.e., in particular for acquisition, storage and updating. Therein, both HMI display data, which are to be output to a mobile control and monitoring module, and HMI input data, which are to be received by a mobile control and monitoring module, are processed. Furthermore, a second unit AMU is provided for managing the second regional control area OA2 of the technical installation M2 and for assigning a universal, mobile control and monitoring module MU located therein. The second regional control area OA2 can be managed using, e.g., stored area coordinates. If the current position of the mobile control and monitoring module lies within the boundaries of the permissible area coordinates, the second unit performs the desired assignment of a control and monitoring module to the technical installation. The second data interface ASK of the HM data module AP2 enables a preferably contactless exchange of HMI data with the universal, mobile control and monitoring module located within the regional control area of the technical installation.

The mobile control and monitoring module MU receives this data via a first external data interface MSK in a contactless manner and supplies this data, preferably via an internal data bus MUDB and a processing unit MVE, to an additional unit MBO, e.g., an LCD display, in particular for outputting HMI display data. Furthermore, a specifying unit MBE is provided for specifying HMI input data, e.g., a keyboard or a touch-sensitive display, such as a touch screen, for example. Input values entered by a person via the specifying unit are loaded back to the HMI data module in a contactless manner, preferably via the processing unit MVE and the data interface MSK.

Advantageously, the exemplary embodiment of a mobile control and monitoring module MU shown in FIG. 4, which can be used in the system according to the invention, has a second external data interface MSP. This second external data interface MSP exchanges, in contactless manner, positioning signals for determining the position of the module MU with, e.g., the transmitting and receiving stations GPS1, GPS2, GPS3 of a satellite system. Finally, a buffer MUS is provided for buffering data, in particular position data and HMI data, i.e., HMI input data, HMI initialization data and HMI display data.

It is one special advantage of the invention that, unlike conventional HMI devices, the function of managing HMI data is assigned to an HMI data module, and the function of displaying and controlling HMI data is assigned to a universal, mobile control and monitoring module. The "management" and "display and control" functions are thus assigned to those devices in which they can be implemented in the most effective manner. For example, a technical installation represents a source and a destination for HMI data, but is not in every case also suited for direct control and monitoring. On the other hand, a universal, mobile control and monitoring module is best suited to provide display and control functions, but is not in every case suited to also manage possibly voluminous HMI data.

A second exemplary embodiment of an HMI system according to the invention will now be described with reference to FIG. 5 to 7. In the exemplary embodiment of FIG. 5 to 7, and in the exemplary embodiment depicted in FIG. 8 to 10, which will be described in greater detail below, the tasks of the HMI data module described in the exemplary embodiment of FIG. 1 to 3 are carried out by a central server and by HMI communications modules.

Figure 5:
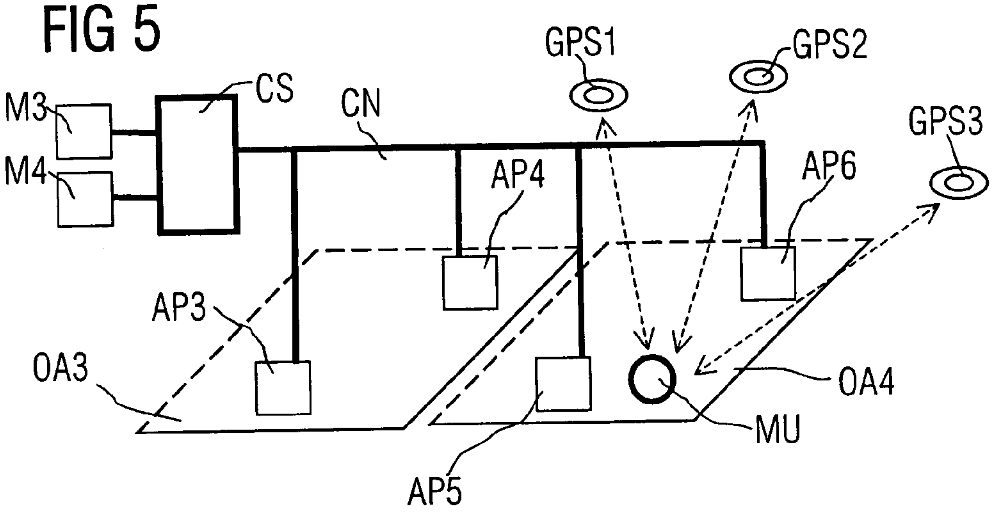
FIG. 5 shows a second embodiment of an HMI system according to the invention, wherein, by way of example, HMI communications modules are connected with a central server via a data network, and, wherein, in a first step, positioning signals are received from a mobile control and monitoring module so as to determine the position of the mobile module.
Figure 6:
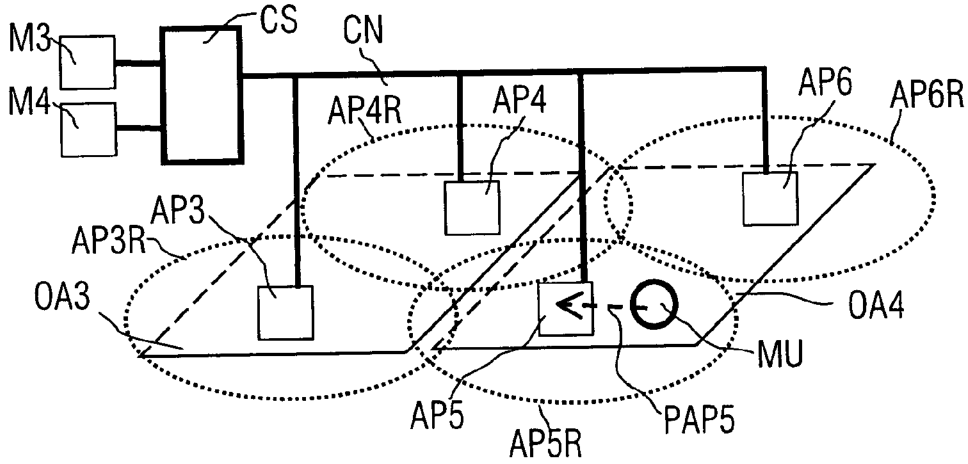
FIG. 6 shows the second, exemplary embodiment of FIG. 5, wherein, in a second step, the mobile control and monitoring module sends transmission messages, which include, in particular, position data, so as to establish a data connection with an HMI communications module in whose transmitting and receiving area the mobile control and monitoring module is located.
Figure 7:
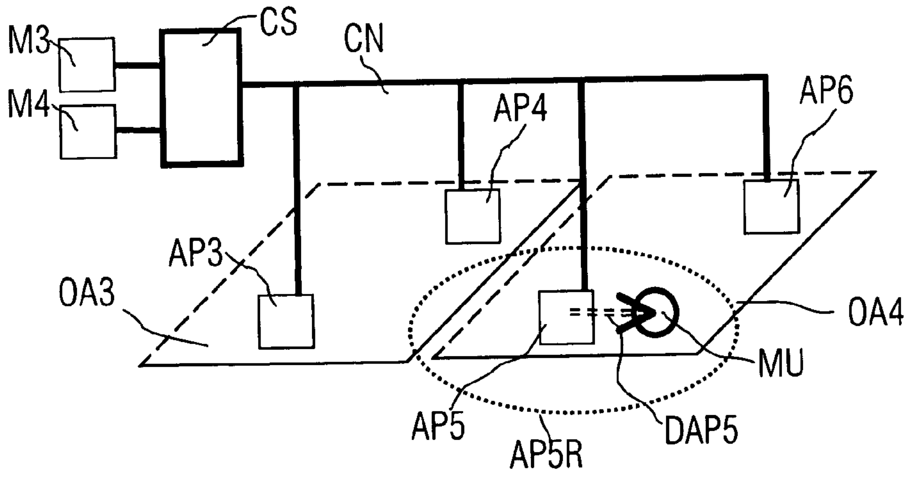
FIG. 7 shows the second exemplary embodiment of FIG. 5, wherein, in a third step, the HMI communications module, in whose transmitting and receiving area the mobile control and monitoring module is located, sends data messages to the mobile control and monitoring module, which are selected by a central server, and which include, in particular, HMI initialization data and HMI display data.

A first and second HMI communications module AP3 and AP4, which have a respective transmitting and receiving area AP3R and AP4R indicated by dashed ovals in FIG. 5 to 7, open, e.g., a third regional control area OA3. Thus, the transmitting and receiving areas AP3R and AP4R cover the third regional control area OA3 completely. In the exemplary embodiment illustrated in FIG. 5 to 7, the first and second HMI communications modules AP3 and AP4 and, thus, the third regional control area OA3 are assigned to a technical installation M3.

A third and fourth HMI communications module AP5 and AP6, which have a respective transmitting and receiving area AP5R and AP6R indicated by dashed ovals in FIG. 5 to 7, open e.g., a fourth regional control area OA4. Thus, the transmitting and receiving areas AP5R and AP6R cover the fourth regional area OA4 completely. In the exemplary embodiment illustrated in FIG. 5 to 7, the third and fourth HMI communications modules AP5 and AP6, and, thus, the fourth regional control area OA4 are assigned to a technical installation M4.

Via a data network CN, the HMI communications modules AP3, AP4, AP5, AP6 are connected to a central server CS for HMI data. The central server CS is connected to the technical installations M3, M4 and has a first unit for managing HMI data of the technical installations M3, M4. Preferably, the HMI data of the technical installations M3, M4 are cyclically managed. Furthermore, a second unit is provided for managing the regional control areas OA3 and OA4 of the technical installations M3, M4, and for assigning a universal, mobile control and monitoring module MU, if that module's current position lies within one of the regional control areas OA3 or OA4. Furthermore, the HMI communications modules AP3, AP4 and AP5, AP6 are assigned, as described above, to the technical installation M3 or M4. The HMI communications modules are connected to the central server CS via the network CN and have a loading unit to load at least HMI data of the technical installations M3 or M4 into an associated universal, mobile control and monitoring module MU.

Comparable to FIG. 1, FIG. 5 shows how, in a first step, a mobile control and monitoring module MU receives positioning signals to determine the position of the module MU. These positioning signals are provided, for example, by a satellite system GPS1, GPS2, GPS3, in particular a GPS satellite system.

Comparable to FIG. 2, FIG. 6 illustrates how, in a second step, the mobile control and monitoring module MU sends transmission messages PAP5, which contain, in particular, position data. In the exemplary embodiment of FIG. 6, the closest HMI communications module AP5 receives the position data and transmits it to the central server CS. The transmission messages PAP5 of the mobile control and monitoring module MU thus reach precisely the HMI communications module AP5 in whose transmitting and receiving area AP5R the mobile control and monitoring module MU is located, in particular for purposes of transmitting position data or HMI input data. In principle, however, each of the HMI communications modules AP3 to AP6 can receive the position data, irrespective of whether the control and monitoring module is currently located within the associated regional control area. It is only necessary to ensure that a connection is possible via the transmitting and receiving area of at least one HMI communications module. With the aid of the central server CS, the universal mobile control and monitoring module MU is now at least temporarily assigned to the regional control area OA4 and, thus, to the technical installation M4.

Finally, comparable to FIG. 3, FIG. 7 shows how, in a third step, the HMI communications module AP5 transmits data messages DAP5 selected by the central server CS to the mobile control and monitoring module. Therein, the mobile control and monitoring module MU is located in the transmitting and receiving area AP5R, and the data messages DAP5 contain, in particular, HMI display data and/or HMI initialization data.

A third and fourth exemplary embodiment of an HMI system according to the invention will now be described with reference to FIG. 8 to 10 and FIGS. 11 and 12. Again, a central server CS is provided to which, for example, four HMI communications modules AP3 to AP6 are connected, each of which has a respective transmitting and receiving area AP3R to AP6R. Since these arrangements largely correspond to those depicted in FIG. 5 to 7, reference is made to the corresponding description above so as to avoid repetition. The significant differences in the embodiments of FIG. 8 to 10 and FIGS. 11 and 12 compared to the embodiment shown in FIG. 5 to 7 lie in the respective, different manner in which the position of a mobile control and monitoring module MU is determined.

Figure 8:
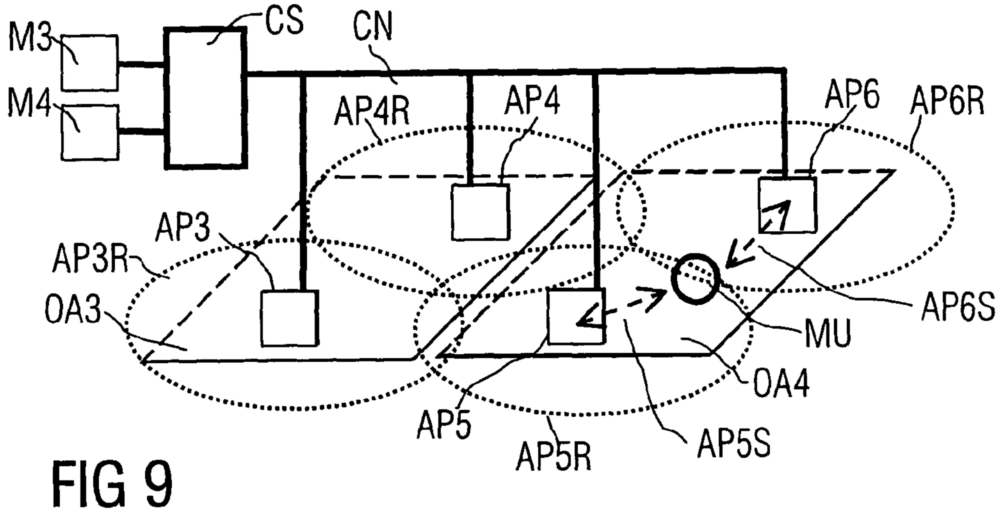
FIG. 8 shows a third exemplary embodiment of an HMI system according to the invention, wherein HMI communications modules are connected to a central server; wherein, in a first step, short-range fields, in particular emission signals from neighboring HMI communications modules, are received from a mobile control and monitoring module; and wherein the short-range fields are analyzed or evaluated so as to determine a position of the mobile module.
Figure 9:
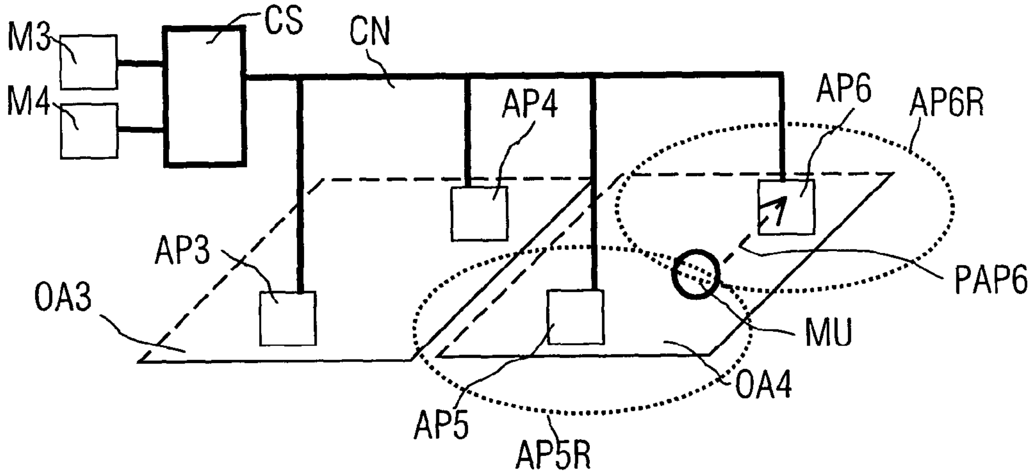
FIG. 9 shows the third, exemplary embodiment of FIG. 8, wherein, in a second step, the mobile control and monitoring module sends transmission messages that include, in particular, position data to the closest HMI communications module, which is, e.g., coupled to the end of a data bus, so as to establish a data connection with this HMI communications module within the assigned regional control area.
Figure 10:
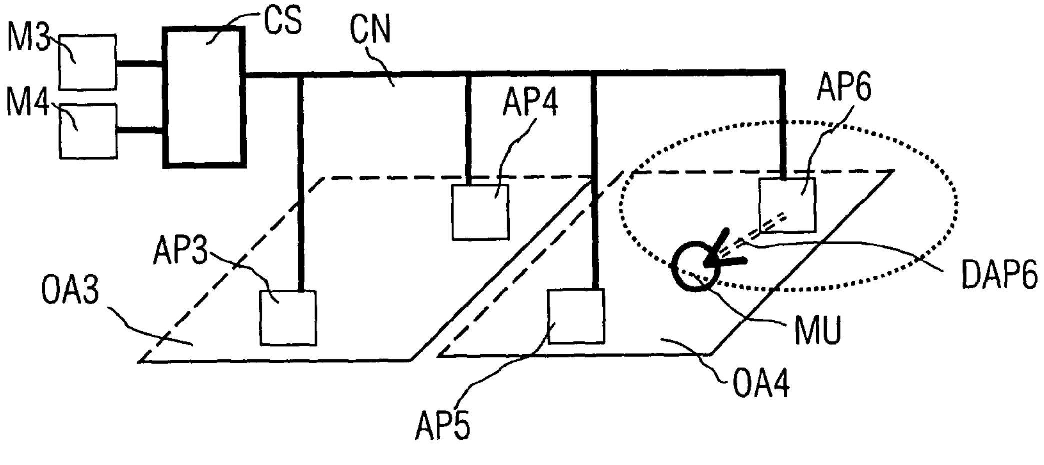
FIG. 10 shows the third, exemplary embodiment of FIG. 8, wherein, in a third step, the closest HMI communications module sends data messages, which are provided by the central server, to the mobile control and monitoring module, and wherein the data messages include, in particular, HMI initialization data and HMI display data.

In the exemplary embodiment of FIG. 8, the mobile control and monitoring module MU receives and analyzes, in a first step, short-range fields so as to determine the position of the module MU. These short-range fields are, in particular, emission signals of neighboring HMI communications modules. In FIG. 8, these emission signals are, for example, emission signals AP5S, AP6S of the third and fourth HMI communications module AP5, AP6, in particular field strengths emitted therefrom. In a second step, as illustrated in FIG. 9, the mobile control and monitoring module MU sends transmission messages PAP6 to the closest HMI communications module AP6. The transmission messages PAP6 contain, in particular, position data, and the closest HMI communications module AP6 is, in this case, coupled to the end of the data bus or data network CN, for example. As illustrated in FIG. 10, since the mobile communications and monitoring module MU is now assigned to the regional control area OA4 and, thus, to the technical installation M4, data messages DAP6, which are provided by the central server CS, are transmitted, in a third step, to the mobile control and monitoring module MU. The transmission of the data messages DAP6 takes place, e.g., via the closest HMI communications module AP6, and the data messages DAP6 contain, in particular, associated HMI display data and/or HMI initialization data.

Figure 11:
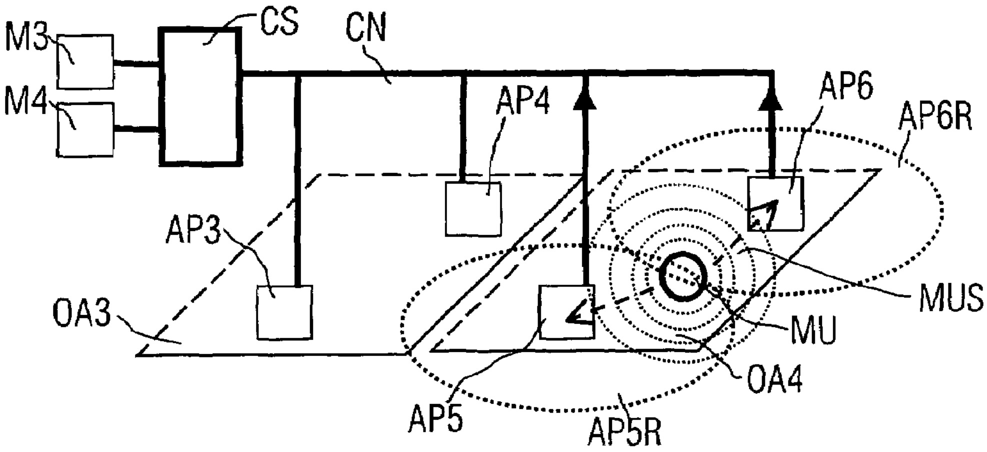
FIG. 11 shows a fourth exemplary embodiment of an HMI system according to the invention, wherein HMI communications modules are connected to a central server, and wherein, in a first step, neighboring HMI communications modules receive radio emissions of a mobile control and monitoring module so as to determine the mobile module's position.
Figure 12:
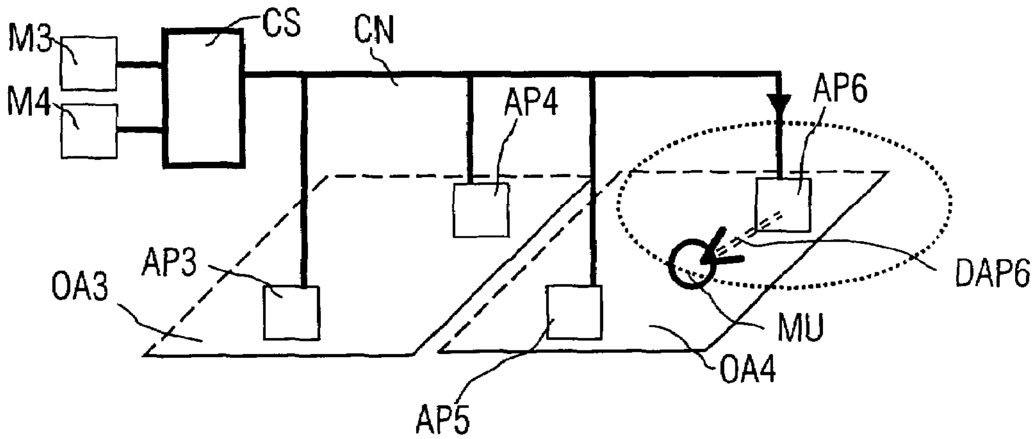
FIG. 12 shows the fourth exemplary embodiment of FIG. 11, wherein, in a third step, the closest HMI communications module sends data messages, which are provided by the central server, to the mobile control and monitoring module, and wherein the data messages include, in particular, HMI initialization data and HMI display data.

In contrast, in the exemplary embodiment of FIG. 11, emissions MUS of the mobile control and monitoring module MU are received, in a first step, by neighboring HMI communications modules, e.g., the modules AP5, AP6, and are analyzed to determine the position of the mobile control and monitoring module MU. The receiving devices in the HMI communications modules that are required for this purpose are configured, e.g., as GSM, GPRS or WLAN transmitting and receiving devices. The position is then determined by analyzing these emissions, either in an HMI communications module or in the central server. As illustrated in FIG. 12, since the mobile control and monitoring module MU is now assigned to the regional control area OA4 and, thus, to the technical installation M4, data messages DAP6, which are provided by the central server CS, are transmitted, in a third step, to the mobile control and monitoring module MU. The transmission of the data messages DAP6 takes place, e.g., via the closest HMI communications module AP6, and the data messages DAP6 contain, in particular, associated HMI display data and/or HM initialization data.

A fifth exemplary embodiment of the HMI system according to the invention will now be described with reference to FIGS. 13 and 14. Since these arrangements are comparable to the arrangement depicted in FIG. 1 to 3, reference is made to the corresponding description provided above so as to avoid repetition. The significant difference in the embodiment depicted in FIG. 13, 14, as compared to the embodiment of FIG. 1 to 3, lies in the manner of determining the position of a mobile control and monitoring module MU.

Figure 13:
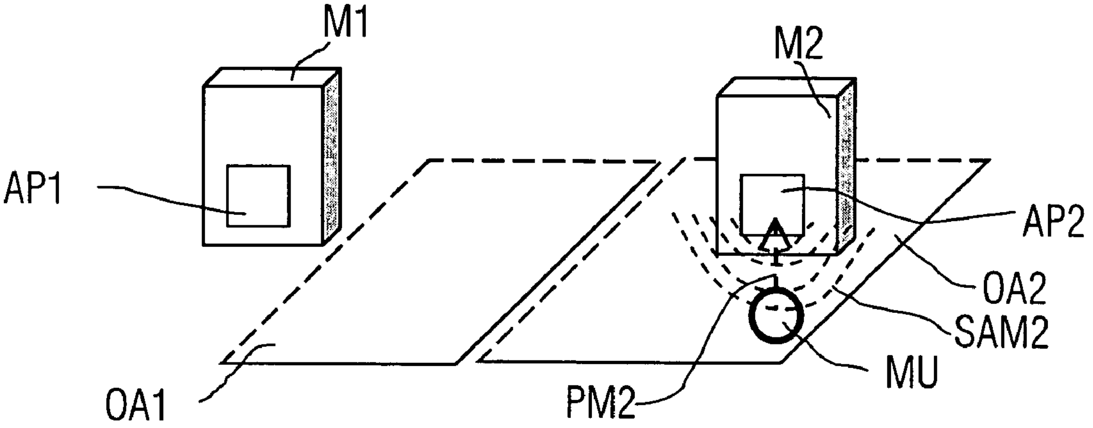
FIG. 13 shows a fifth, exemplary embodiment of an HMI system according to the invention, wherein an HMI data module is integrated into a respective technical installation, and wherein, in a first step, the position of the mobile control and monitoring module is determined through placement of the mobile module in the data acquisition range or data detection range of an HMI data module.
Figure 14:
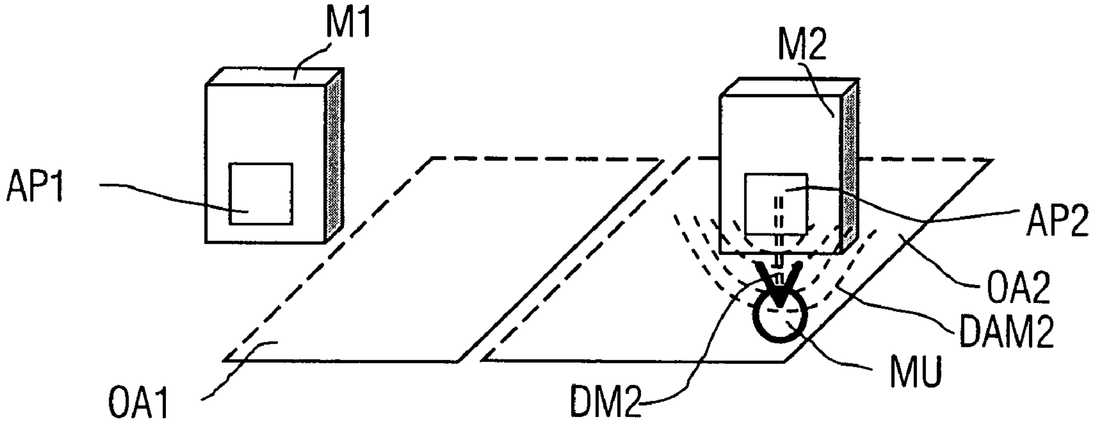
FIG. 14 shows the fifth, exemplary embodiment of FIG. 13, wherein the HMI data module, in whose data detection range the mobile control and monitoring module is located, sends data messages to the mobile control and monitoring module, and wherein the data messages include, in particular, HMI initialization data and HMI display data.

In the first step, as illustrated in FIG. 13, the mobile control and monitoring module MU itself determines its position. For this purpose, proximity fields or short-range fields SAM2, which are emitted by the HMI data module AP2, are received and analyzed. Therein, the HMI data module AP2 is located in spatial proximity to the module MU and integrated in the second technical installation M2. These proximity fields or short-range fields are based, for example, on a known transmission standard, e.g., on the so-called BLUETOOTH or Infrared standard. The position of the mobile control and monitoring module MU is determined by placing the module MU within the data acquisition range or data detection range of an HMI data module. Once the mobile control and monitoring module MU has determined its position, and once the module MU has transmitted its position to the HMI data module AP2, the module MU is assigned to the regional control area OA2 and, thus, to the technical installation M2. In a third step, by emissions within the data transmission range DAM2 of the HMI data module AP2, the associated HMI display data and/or HMI initialization data can now be transmitted to the mobile control and monitoring module MU, as illustrated in FIG. 14.

The above description of the preferred embodiments has been given by way of example. From the disclosure given, those skilled in the art will not only understand the present invention and its attendant advantages, but will also find apparent various changes and modifications to the structures and methods disclosed. It is sought, therefore, to cover all such changes and modifications as fall within the spirit and scope of the invention, as defined by the appended claims, and equivalents thereof.

LIST OF REFERENCE NUMERALS

FIG. 1-3

OA Control area, in particular a control area in a manufacturing area

M1, M2 A first and second technical installation, respectively, e.g., a production machine or a processing machine AP1, AP2 A first and second HMI data module, respectively, which is connected to or integrated into the first and second technical installation M1 or M2

OA1 A first regional control area within the control area OA, which is assigned, for example, to the technical installation M1 located adjacent thereto and which is managed by the first HMI data module AP1 connected thereto OA2 A second regional control area within the control area OA, which is assigned, for example, to the technical installation M2 located therein and which is managed by the second HMI data module AP2 connected thereto MU Universal mobile control and monitoring module, in particular a mobile handheld terminal, which is located, in the exemplary embodiment of FIG. 1 to 3, in the second regional control area OA2 that is managed by the second HMI data module AP2 of the second technical installation M2

GPS1-GPS3 Transmitting and receiving stations of a satellite system for positioning signals for determining the position of the mobile control and monitoring module, e.g., for transmitting GPS type positioning signals PM1, PM2 Transmission messages of the mobile control and monitoring module MU to the HMI data modules AP1, AP2, which are arranged within the control area OA for transmitting position data or HMI input data DM2 HMI data messages from the HMI data module AP2 of the technical installation M2 to the mobile control and monitoring module MU for loading HMI data of the technical installation M2, in particular HMI initialization data or HMI display data

FIG. 4

M2, Second Technical Installation

BM21, BM22, BM23 Internal apparatuses of the second technical installation M2, which generate or require the HMI data, via a mobile control and monitoring module MU, for display or control purposes M2 DB Internal data bus AP2, Second HMI Data Module AVE Processing unit AUS First unit for preferably cyclically managing HMI data of the technical installation M2, in particular for acquiring, storing and updating HMI data of the internal apparatuses BM21, BM22, BM23, i.e., both HMI display data to be output to a mobile control and monitoring module and HMI input data to be received by a mobile control and monitoring module AS1 First data interface for transmitting HMI data of the assigned technical installation, in particular HMI data of the apparatuses BM21, BM22, BM23 of the technical installation M2

AMU Second unit for managing the second regional control area of the technical installation and for assigning a mobile control and monitoring module MU located therein ASK Second data interface for transmitting HMI data to a mobile universal control and monitoring module located within the regional control area of the technical installation, preferably in contactless manner MU, Mobile Control and Monitoring Module MSK First external data interface for contactless data exchange with the second HMI data module AP2, i.e., for transmitting position data and/or HMI input data and for transmitting HMI initialization data and/or HMI display data MSP Second external data interface for the contactless exchange of radio positioning signals for position determination purposes MVE Processing unit MUDB Internal data bus MUS Buffer for storing data, in particular position data, HMI input data, HMI initialization data and HMI display data MBO Additional unit for outputting HMI display data, e.g., an LCD display MBE Specifying unit for specifying HMI input data, e.g., a keyboard or a touch-sensitive display, such as a touch screen

FIG. 5-7

AP3, AP4 A first and second HMI communications module, respectively

AP3R, AP4R Transmitting and receiving areas of the first and the second HMI communications module AP3, AP4, respectively AP5, AP6 A third and fourth HMI communications module, respectively AP5R, AP6R Transmitting and receiving areas of the third and the fourth HMI communications module AP5, AP6, respectively OA3 Third regional control area, which is opened by the two HMI communications modules AP3, AP4 located therein OA4 Fourth regional control area, which is opened by the two HMI communications modules AP5, AP6 located therein CS Central server for HMI data CN Data network for connecting the HMI communications modules AP3, AP4, AP5, AP6 to the central server for HMI data PAP5 Transmission messages of the mobile control and monitoring module MU to the HMI communications module AP5 in whose transmitting and receiving area AP5R the mobile control and monitoring module MU is located, in particular for transmitting position data and/or HMI input data DAP5 Data messages from the HMI communications module AP5 to the mobile control and monitoring module MU, in particular for transmitting HMI initialization data and/or HMI display data

FIG. 8-10

AP5S, AP6S Emission signals from the third and fourth HMI communications module, in particular their field strengths, which are received by the mobile control and monitoring module MU to determine its position PAP6 Transmission messages of the mobile control and monitoring modules MU to an HMI communications module, e.g., to the HMI communications module AP6, which is connected at the end of the data network CN, for transmitting position data and/or HMI input data to the central server CS for HMI data DAP6 Data messages from the closest HMI communications module AP6 to the mobile control and monitoring module MU for transmitting HMI initialization data and/or HMI output data, which are provided by the central server CS, specifically for the control and monitoring module MU located within the fourth regional control area OA4

FIGS. 11, 12

MUS Radio emissions of the mobile control and monitoring module MU, received by the neighboring HMI communications module AP5, AP6 and analyzed to determine the position of the mobile control and monitoring module MU

FIG. 13-14

SAM2 data acquisition area of the second HMI data module AP2 in the second technical installation M2

DAM2 data transmission area of the second HMI data module AP2 in the second technical installation M2

What is claimed is:

1. A method for allowing a universal mobile control and monitoring module to control and monitor a technical installation, wherein the technical installation is assigned to at least one regional control sub-area located within a control area, the method comprising:

determining a current position of the universal mobile control and monitoring module by means of positioning signals;

assigning the universal mobile control and monitoring module to the technical installation, if the current position of the universal mobile control and monitoring module lies within the regional sub-control area of the technical installation;

transmitting from the technical installation and loading human-machine-interface (HMI) data of the technical installation into the assigned universal mobile control and monitoring module; and controlling the technical installation using the HMI data loaded into the assigned universal mobile control and monitoring module, wherein said loading of the HMI data for the control of the technical installation into the assigned universal mobile control and monitoring module is controlled as a function of a distance from the technical installation to the assigned universal mobile control and monitoring module.

2. The method as claimed in claim 1, further comprising loading HMI display data into the assigned universal mobile control and monitoring module.

3. The method as claimed in claim 2, wherein the HMI display data comprises at least process values of the technical installation.

4. The method as claimed in claim 3, wherein the process values comprise actual values and alarm messages of technical apparatuses of the technical installation.

5. The method as claimed in claim 1, further comprising loading HMI initialization data into the assigned universal mobile control and monitoring module.

6. The method as claimed in claim 5, wherein the HMI initialization data at least parameterizes a display of the HMI data of the technical installation on the assigned universal mobile control and monitoring module.

7. The method as claimed in claim 1, further comprising:

updating the HMI data in the assigned universal mobile control and monitoring module; and uploading the updated HMI data into the technical installation.

8. The method as claimed in claim 7, wherein the updated HMI data comprises HMI input data.

9. The method as claimed in claim 7, wherein the uploaded HMI data comprises specified values for the technical installation.

10. The method as claimed in claim 9, wherein the specified values comprise desired values and default values for technical apparatuses of the technical installation.

11. The method as claimed in 1, wherein said transmitting the HMI data as the function of the current position of the assigned universal mobile control and monitoring module only occurs in the regional control sub-area of the assigned technical installation.

12. The method as claimed in claim 1, wherein at least one type of the HMI data is blocked when the assigned universal mobile control and monitoring module is in close physical proximity to technical installation.

13. The method as claimed in claim 1, farther comprising utilizing a mobile telephone as the universal mobile control and monitoring module.

14. The method as claimed in claim 1, farther comprising utilizing a personal digital assistant (PDA) as the universal mobile control and monitoring module.

15. The method as claimed in claim 1, wherein the universal mobile control and monitoring module is assigned to the technical installation only if the current position of the universal mobile control and monitoring module is within the regional sub-control area of the technical installation.

16. The method as claimed in claim 15, wherein, when the current position of the universal mobile control and monitoring module is outside the regional sub-control area of the technical installation, the universal mobile control and monitoring module is not assigned to the technical installation.

17. The method as claimed in claim 1, wherein said assigning comprises establishing a data connection between the universal mobile control and monitoring module and the technical installation.

18. The method as claimed in claim 1, wherein the technical installation is located adjacent to the regional control sub-area in which the universal mobile control and monitoring module is located and wherein the HMI data of the technical installation is output to the universal mobile control and monitoring module.

19. The method as claimed in claim 1, wherein the technical installation is located adjacent to the regional control sub-area in which the universal mobile control and monitoring module is located and wherein the HMI data of the technical installation is stored in the universal mobile control and monitoring module.

20. The method as claimed in claim 1, wherein the HMI data of the technical installation is used to initialize and parameterize the display of the universal mobile control and monitoring module.

21. The method as claimed in claim 1, wherein the controlling of the technical installation comprises: the universal mobile control and monitoring module transmitting to the technical installation values input into the assigned universal mobile control and monitoring module, and the technical installation using the transmitted values to change operating state of the technical installation.

22. The method as claimed in claim 1, wherein the technical installation determines at least one type of the HMI data, from a plurality of types of the HMI data that belong to the technical installation, to transmit to the assigned universal mobile control and monitoring module based on location of the assigned universal mobile control and monitoring module.

23. The method as claimed in claim 22, wherein the technical installation transmits different types of the HMI data to the assigned universal mobile control and monitoring module based on whether the technical installation is visible from a location of the assigned universal mobile control and monitoring module.

24. The method as claimed in claim 1, wherein the technical installation is a machine and wherein the machine transmits different types of the HMI data for controlling and monitoring the machine to the assigned universal mobile control and monitoring module based on a location of the assigned universal mobile control and monitoring module with respect to the assigned machine.

25. A human-machine-interface (HMI) system, comprising:

a technical installation;

at least one universal mobile control and monitoring module configured to control and monitor the technical installation; and at least one HMI data module assigned to the technical installation, the HMI data module comprising:

a managing device configured to manage HMI data of the technical installation;

a managing-and-assigning device configured to manage a regional control sub-area of the technical installation and configured to assign the universal mobile control and monitoring module to the technical installation, if a current position of the universal mobile control and monitoring module lies within the regional sub-control area of the technical installation; and a loading device configured to load the HMI data of the technical installation provided by the technical installation into the assigned universal mobile control and monitoring module, wherein the technical installation is controlled using the HMI data loaded into the assigned universal mobile control and monitoring module, wherein said loading of the HMI data for the control of the technical installation into the assigned universal mobile control and monitoring module is controlled as a function of a distance from the technical installation to the assigned universal mobile control and monitoring module.

26. The HMI system as claimed in claim 25, wherein the managing device is configured to cyclically manage the HMI data of the technical installation.

27. The HMI system as claimed in claim 25, wherein the HMI data module is integrated into the technical installation.

28. The HMI system as claimed in claim 25, further comprising a data bus configured to couple the HMI data module to the technical installation.

29. The HMI system as claimed in claim 25, wherein the loading device is configured to transmit the HMI data in contactless manner to the assigned universal mobile control and monitoring module.

30. The HMI system as claimed in claim 25, wherein the HMI data module further comprises a receiver configured to receive at least transmission messages from the assigned universal mobile control and monitoring module, and wherein the transmission messages comprise at least HMI input data for updating the HMI data of the technical installation.

31. The HMI system as claimed in claim 25, wherein the universal mobile control and monitoring module comprises a position determination device configured to analyze positioning signals that are provided by a satellite system, and configured to transmit the current position of the universal mobile control and monitoring module to the managing-and-assigning device of the HMI data module.

32. The HMI system as claimed in claim 31, wherein the satellite system comprises a GPS satellite system.

33. The HMI system as claimed in claim 25, wherein the universal mobile control and monitoring module comprises a position determination device configured to analyze short -range fields, which are received in the regional control subarea as positioning signals, and configured to transmit the current position of the universal mobile control and monitoring module to the managing-and-assigning device of the HMI data module.

34. The HMI system as claimed in claim 33, wherein the short-range fields are based on at least one of a Bluetooth™ standard and an Infrared standard.

35. The HMI system as claimed in claim 33, wherein the short-range fields are based on a wireless short range communication standard.

36. The HMI system as claimed in claim 35, wherein the short-range wireless communication standard is up to approximately ten meters.

37. The HMI system as claimed in claim 35, wherein the short-range wireless communication standard is up to approximately hundred meters.

38. The system as claimed in claim 25, wherein the managing-and-assigning device assigns the universal mobile control and monitoring module to the technical installation only if the current position of the universal mobile control and monitoring module is within the regional sub-control area of the technical installation.

39. The system as claimed in claim 38, wherein, when the current position of the universal mobile control and monitoring module is outside the regional sub-control area of the technical installation, the managing-and-assigning device does not assign the universal mobile control and monitoring module to the technical installation.

* * * * *